(12) United States Patent
Ford et al.

(10) Patent No.: US 7,023,004 B2
(45) Date of Patent: Apr. 4, 2006

(54) MULTI-MODE ELECTROMAGNETIC RADIATION EMITTING DEVICE

(76) Inventors: Timothy Ford, 7 Redfern Place, Beaconsfield, Quebec (CA), H8W 4M7; Stephane Gascon, 461 Caron, Mascouche, Quebec (CA), J7K 3R7

( * ) Notice: Subject to any disclaimer, the term of this patent is extended or adjusted under 35 U.S.C. 154(b) by 189 days.

(21) Appl. No.: 10/692,294

(22) Filed: Oct. 23, 2003

(65) Prior Publication Data
US 2005/0087702 A1 Apr. 28, 2005

(51) Int. Cl.
*G05F 1/00* (2006.01)
*H01K 1/62* (2006.01)

(52) U.S. Cl. .................. 250/495.1; 250/493.1; 250/504 R; 315/338; 315/352

(58) Field of Classification Search ............ 250/495.1, 250/493.1, 504 R; 315/338, 352
See application file for complete search history.

(56) References Cited

U.S. PATENT DOCUMENTS

| | | | | | |
|---|---|---|---|---|---|
| 4,906,858 | A | * | 3/1990 | Gesin | 307/11 |
| 6,002,212 | A | * | 12/1999 | Gagnot et al. | 315/291 |
| 6,445,132 | B1 | * | 9/2002 | Ford | 315/56 |
| 6,670,874 | B1 | | 12/2003 | Galli | |

* cited by examiner

*Primary Examiner*—Nikita Wells
(74) *Attorney, Agent, or Firm*—Nicholas A. Kees; Godfrey & Kahn, S.C.

(57) ABSTRACT

A multi-mode electromagnetic radiation emitting device comprising at least one source of electromagnetic radiation which emits radiation according to predefined or programmable user selectable instruction sets is disclosed. Reversal of the polarity of the device's power supply allows for enhanced features to be accessed including multiple instruction sets per switch setting, reprogramming mode, infra-red (covert) mode, night mode and water activation mode.

A switch mechanism for providing selectable switched circuit connections is also disclosed as well as a power supply for supplying DC power to an electronic circuit comprising at least one microcontroller or microprocessor.

34 Claims, 13 Drawing Sheets

MULTI-MODE ELECTROMAGNETIC RADIATION EMITTING DEVICE

FIELD OF THE INVENTION

The present invention relates to a multi-mode electromagnetic radiation emitting device. More specifically, the present invention relates to a device which emits electromagnetic radiation in the visible or infra-red range according to instructions sets with an enhanced functionality based on reversal of the polarity of the DC power source. The present invention also relates to a switch mechanism for a multi-mode electromagnetic radiation emitting device and a power supply for supplying DC power and control information to a microcontroller or microprocessor based on reversal of the polarity of the DC power source.

BACKGROUND OF THE INVENTION

The prior art reveals a plethora of small light emitting devices to be worn by a user not only for the purposes of illumination but also for notification, alerting and identification. Recent improvements in high-intensity light emitting diodes (LEDs) have allowed arrays of small high-intensity lights of differing colours or wavelengths to be combined in a single signalling device. By equipping these prior art devices with a suitable microprocessor or microcontroller, a series of signalling programs and a multi-position switch for program selection, the array of LEDs can be turned on and off and their intensity varied according to the selected program.

There also exist in the art portable signalling devices comprising an array of user selectable LEDs, with at least one diode emitting light in the visible light range and at least one emitting light in the infra-red range. As is known in the art, devices operating in the infra-red range are not visible to the naked eye, but are typically visible for many miles to an observer equipped with, for example, a night vision system including a suitable infra-red image intensifier. In these prior art devices, the user typically selects the light to be emitted via a switch mechanism, with one favoured prior art switch being the bezel mounted multi-position rotary dial for rotation in a clockwise or counter-clockwise direction.

One drawback of these prior art signalling devices is that the number of programs which can be selected is typically limited by the number of positions available on the multi-position switch. Another drawback is that such prior art devices do not present a means to reprogram the signalling programs if this is so desired. Still, another drawback with such prior art devices is that it is fairly simple for the user to err in his selection of the visible light and infra-red light. In a night time situation, the selection of visible light when infra-red light is intended can have a number of dire consequences, including temporarily affecting the user's night vision or exposure of the user's position which, in a battle situation, can lead to serious injury or even death.

SUMMARY OF THE INVENTION

The present invention addresses the above and other drawbacks by providing for a multi-mode electromagnetic radiation emitting device. The device comprises an emission module comprising at least one electromagnetic radiation emitting source, a first terminal, a second terminal and a polarity responsive controller interposed between the electromagnetic radiation emitting sources and the first and second terminals, a DC power source having a positive terminal and a negative terminal, and a polarity switch selectively defining either interconnections between (a) the first and positive terminals and (b) the second and negative terminals, or interconnections between (a) the first and negative terminals and (b) the second and positive terminals. The polarity responsive controller comprises a first bank of instructions and a second bank of instructions, each of the first and second banks having at least two predetermined sets of signalling instructions, a switch for selecting a first set of instructions from the sets of instructions in the first bank and a second set of instructions from the second bank, and first and second power supply circuits. The first power supply circuit is activated by the interconnections between (a) the first and positive terminals and (b) the second and negative terminals, and supplying, when activated, power from the DC power source to the electromagnetic radiation emitting sources according to the first set of instructions, thereby causing the sources to emit electromagnetic radiation according to the first set of instructions. The second power supply circuit is activated by the interconnections between (a) the first and negative terminals and (b) the second and positive terminals, and supplies, when activated, power from the DC power source to the electromagnetic radiation emitting sources according to the second set of instructions, thereby causing the sources to emit electromagnetic radiation according to the second set of instructions.

Additionally, there is provided for a reprogrammable multi-mode electromagnetic radiation emitting device. The device comprises an emission module comprising at least one electromagnetic radiation emitting source, a first terminal, a second terminal and a polarity responsive controller interposed between the electromagnetic radiation emitting sources and the first and second terminals, a DC power source having a positive terminal and a negative terminal, and a polarity switch selectively defining either interconnections between (a) the first and positive terminals and (b) the second and negative terminals, or interconnections between (a) the first and negative terminals and (b) the second and positive terminals. The polarity responsive controller comprises a set of signalling instructions, a power supply circuit and a reprogramming circuit. The power supply circuit is activated by the interconnections between (a) the first and positive terminals and (b) the second and negative terminals, and supplies, when activated, power from the DC power source to the electromagnetic radiation emitting sources according to the set of signalling instructions, thereby causing the sources to emit electromagnetic radiation according to the set of instructions. The reprogramming circuit is activated by the interconnections between (a) the first and negative terminals and (b) the second and positive terminals, and, when activated, allows the controller to modify the set of signalling instructions.

Also, there is provided for a reprogrammable electromagnetic radiation emitting device. The device comprises an emission module comprising at least one electromagnetic radiation emitting source, a first terminal, a second terminal and a polarity responsive controller interposed between the electromagnetic radiation emitting sources and the first and second terminals, a DC power source having a positive terminal and a negative terminal, and a polarity switch selectively defining either interconnections between (a) the first and positive terminals and (b) the second and negative terminals, or interconnections between (a) the first and negative terminals and (b) the second and positive terminals. The polarity responsive controller comprises an instruction bank having a plurality of sets of signalling instructions, a switch for selecting a set of instructions from the sets of instructions, a power supply circuit and a reprogramming circuit. The power supply circuit is activated by the interconnections between (a) the first and positive terminals and (b) the second and negative terminals, and supplies, when activated, power from the DC power source to the electromagnetic radiation emitting sources according to the selected set of instructions, thereby causing the sources to emit electromagnetic radiation according to the set of instructions. The reprogramming circuit is activated by the interconnections between (a) the first and negative terminals and (b) the second and positive terminals, and, when activated, allows the controller to modify the selected set of instructions.

Furthermore, there is provided for a reprogrammable multi-mode electromagnetic radiation emitting device. The device comprises an emission module comprising at least one electromagnetic radiation emitting source, a first terminal, a second terminal and a polarity responsive controller interposed between the electromagnetic radiation emitting sources and the first and second terminals, a DC power source having a positive terminal and a negative terminal, and a polarity switch selectively defining either interconnections between (a) the first and positive terminals and (b) the second and negative terminals, or interconnections between (a) the first and negative terminals and (b) the second and positive terminals. The polarity responsive controller comprises a plurality of default instruction banks, each of the default banks comprising at least one set of signalling instructions, an active instruction bank having at least two sets of signalling instructions, a switch for selecting one of the sets of instructions of the active instruction bank and for selecting one of the default banks, a power supply circuit and a reprogramming circuit. The power supply circuit is activated by the interconnections between (a) the first and positive terminals and (b) the second and negative terminals, and supplies, when activated, power from the DC power source to the electromagnetic radiation emitting sources according to the selected set of instructions. The reprogramming circuit is activated by the interconnections between (a) the first and negative terminals and (b) the second and positive terminals, and, when activated, the controller replaces the active instruction bank with the selected default bank.

Additionally, there is provided for a night activated electromagnetic radiation emitting device. The device comprises an emission module comprising at least one electromagnetic radiation emitting source, a first terminal, a second terminal and a polarity responsive controller interposed between the electromagnetic radiation emitting sources and the first and second terminals, a DC power source having a positive terminal and a negative terminal, a polarity switch selectively defining either interconnections between (a) the first and positive terminals and (b) the second and negative terminals, or interconnections between (a) the first and negative terminals and (b) the second and positive terminals, and a light sensor. The polarity responsive controller comprises a set of signalling instructions and first and second power supply circuits. The first power supply circuit is activated by the interconnections between (a) the first and positive terminals and (b) the second and negative terminals, and supplies, when activated, power from the DC power source to the electromagnetic radiation emitting sources according to the set of signalling instructions, thereby causing the sources to emit electromagnetic radiation according to the set of instructions. The second power supply circuit is activated by light incident on the light sensor being below a predetermined threshold and the interconnections between (a) the first and negative terminals and (b) the second and positive terminals, and supplies, when activated, power from the DC power source to the electromagnetic radiation emitting sources according to the set of signalling instructions, thereby causing the sources to emit electromagnetic radiation according to the set of instructions.

Also, there is provided for a water activated multi-mode electromagnetic radiation emitting device. The device comprises an emission module comprising at least one electromagnetic radiation emitting source, a first terminal, a second terminal and a polarity responsive controller interposed between the electromagnetic radiation emitting sources and the first and second terminals, a DC power source having a positive terminal and a negative terminal, a polarity switch selectively defining either interconnections between (a) the first and positive terminals and (b) the second and negative terminals, or interconnections between (a) the first and negative terminals and (b) the second and positive terminal, and a water sensor. The polarity responsive controller comprises a set of signalling instructions and first and second power supply circuits. The first power supply circuit is activated by the interconnections between (a) the first and positive terminals and (b) the second and negative terminals, and supplies, when activated, power from the DC power source to the electromagnetic radiation emitting sources according to the set of signalling instructions, thereby causing the sources to emit electromagnetic radiation according to the set of instructions. The second power supply circuit is activated when the water sensor is immersed in water and the interconnections between (a) said first and negative terminals and (b) said second and positive terminals, and supplies, when activated, power from said DC power source to said electromagnetic radiation emitting sources according to said set of signalling instructions, thereby causing said sources to emit electromagnetic radiation according to said set of instructions.

There is also provided a switch mechanism for providing selectable switched circuit connections. The switch mechanism comprises a first part and a second part arranged for relative displacement, a plurality of spaced contact pads mounted on the first part, and at least one contact element mounted on the second part such that the element moves relative to the contact pads in response to movement of the second part relative to the first part, the contact element selectively bridging certain of the contact pads.

There is further provided a switch mechanism for providing selectable switched circuit connections. The switch mechanism comprises a first part and a second part arranged for relative displacement, a plurality of spaced magnetically actuated switches mounted on the first part, and a magnet mounted on the second part such that the magnet moves relative to the switches in response to movement of the second part relative to the first part, the magnet selectively actuates certain of the switches.

There is further provided a multi-mode electromagnetic radiation emitting device tolerant to external magnetic fields. The device comprises a source of power, an emission module comprising at least one electromagnetic radiation emitting source and a switch mechanism for providing selectable switched circuit connections. The switch mechanism comprises a first part and a second part arranged for relative displacement, a ratchet mechanism for limiting the displacement of the first part relative to the second part to predetermined positions, at least one of the predetermined positions being a deactivated position with the remainder being activated positions, a plurality of spaced magnetically actuated switches mounted on the first part, and a magnet mounted on the second part such that the magnet moves relative to the switches in response to movement of the second part relative to the first part. The magnet selectively actuates certain of the switches. When the first part is in one of the deactivated positions, and one or more of the magnetically actuated switches are actuated by the external magnetic field, power from the power source is not provided to the at least one electromagnetic radiation emitting source, thereby preventing the at least one radiation emitting source from emitting radiation.

Also, there is provided a power supply for supplying DC power to an electronic circuit comprising at least one microcontroller or microprocessor. The supply comprises a DC power source comprising a positive terminal and a negative terminal, a power conversion circuit comprising first and second terminals and a power output for supplying power to the electronic circuit, and a polarity switch selectively defining either interconnections between (a) the first and positive terminals and (b) the second and negative terminals, or interconnections between (a) the first and negative terminals and (b) the second and positive terminals. When the power conversion circuit is activated by the interconnections between (a) the first and positive terminals and (b) the second and negative terminals, a positive power from the DC power source is supplied to the electronic circuit together with an indication to the microcontroller of the positive polarity of the voltage between the first and second terminals. When the power conversion circuit is activated by the interconnections between (a) the first and negative terminals and (b) the second and positive terminals, a positive power from the DC power source is supplied to the electronic circuit together with an indication to the microcontroller of the negative polarity of the voltage between the first and second terminals.

BRIEF DESCRIPTION OF THE DRAWINGS

FIG. 9b is a cut away view along 9b in FIG. 9a.

DETAILED DESCRIPTION OF THE ILLUSTRATIVE EMBODIMENTS

Figure 1:
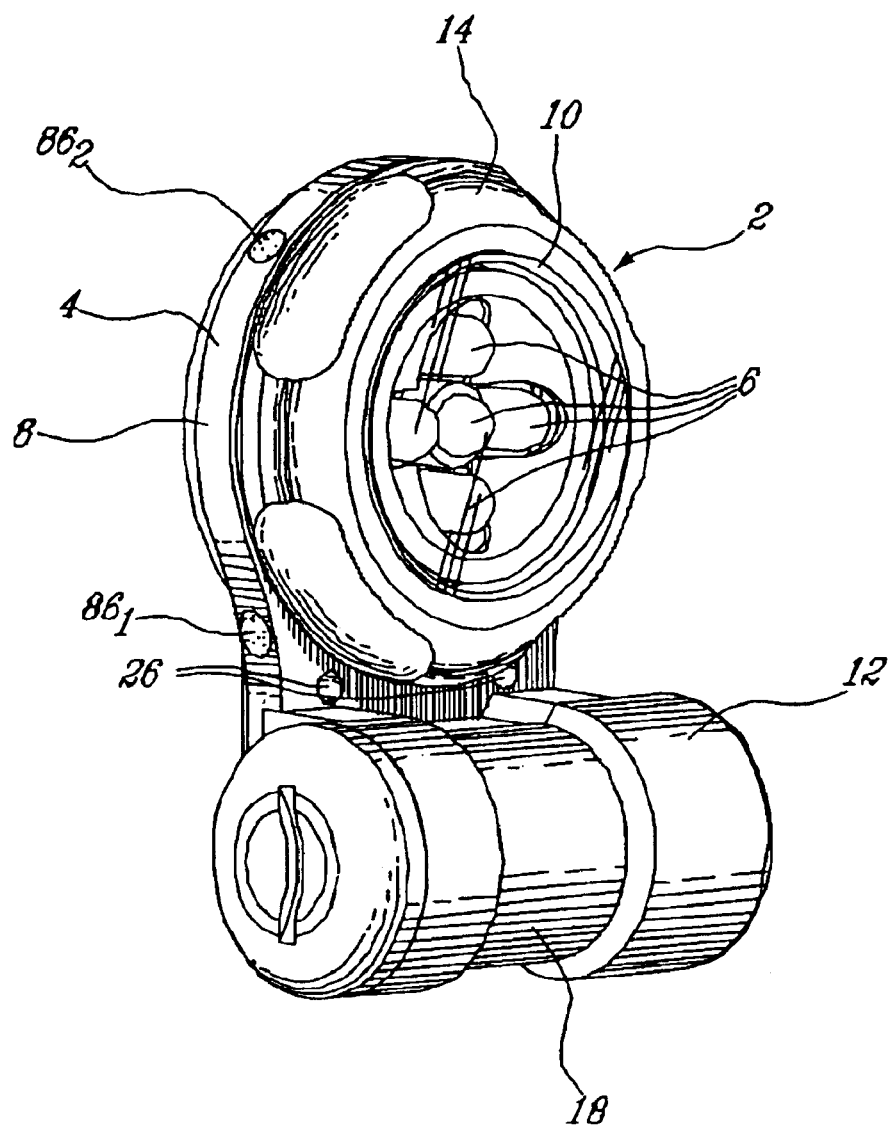
FIG. 1 is side perspective view of a multi-mode electromagnetic radiation emitting device in accordance with an illustrative embodiment of the present invention.

Referring now to FIG. 1, a multi-mode electromagnetic radiation emitting device in accordance with an illustrative embodiment of the present invention will be described. The device, generally referred to using the reference numeral 2, is comprised of a rugged housing 4 fabricated from a durable water resistant material, such as plastic. A series of LEDs as in 6 are mounted on the front face 8 of the housing 4 and protected by a dome shaped lens cap 10 fabricated from a transparent or translucent material such as clear or opaque plastic, or clear plastic with a diffusing pattern etched in a surface thereof. The lens cap 10 is preferably bonded to the front face 8 of the housing 4 with a suitable adhesive or weld in order to prevent moisture entering behind the lens cap and coming into contact with the LEDs 6 or condensing on the inside of the lens cap 10. The housing 4 also includes a compartment 12 which houses a battery (not shown) for supplying power to the electronics (not shown) which power the LEDs 6 when the device is activated. The device 2 also includes a multi-position bezel-like rotary switch 14 mounted around the lens cap 10. In a particular embodiment, the lens cap 10 is rigidly fastened to the housing 4 and also acts as a hub around which the rotary switch 14 can rotate. By rotating the switch 14 in a clockwise or counter-clockwise direction, one of a number of instructions sets can be selected for powering the LEDs 6.

In a given embodiment one or more LEDs 6 may be provided for. The LEDs 6 are typically arranged in banks of two or more LEDs which are driven simultaneously, although in other embodiments the LEDs 6 may be driven individually. It is therefore within the scope of the present invention to drive the LEDs 6 individually or grouped in to banks of more than one LED. Note also that, although the present illustrative embodiment makes references to LEDs, the scope of the present invention could also be extended to comprise the use of other sources of electromagnetic radiation such as lasers, xenon strobes, incandescent lights, thermal emitters (in particular those operating in the 3–5 micron range Medium Wavelength Infrared—MWIR, or the 8–12 micron range LWIR—Long Wavelength Infrared) and combinations thereof.

Figure 2A:
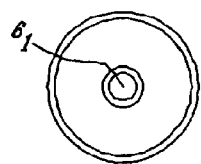
FIGS. 2a through 2f provide front plan views of a number of alternative embodiments of LED configurations in accordance with an illustrative embodiment of the present invention.
Figure 2B:
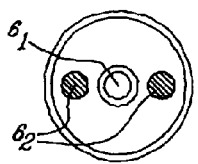
Figure 2C:
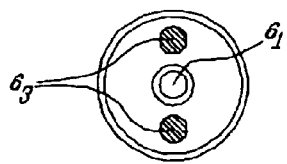
Figure 2D:
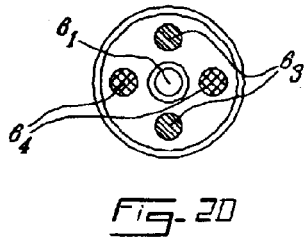
Figure 2E:
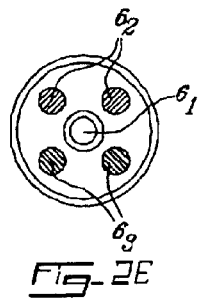
Figure 2F:
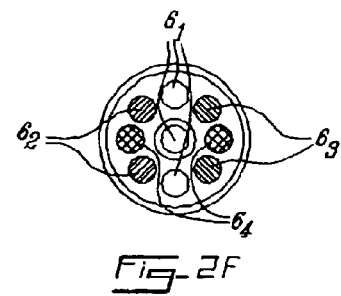

Referring now to FIGS. 2(a)–(f), six (6) LED configurations are illustrated. In FIG. 2(a) a single LED $6_1$ which emits white light is disclosed. In FIG. 2(b), a configuration of three (3) LEDs, one which emits white light $6_1$ and two which emit for example blue light $6_2$ is disclosed. In FIG. 2(c), a second configuration of 3 LEDs is disclosed where one of the LEDs emits white light $6_1$ and the remaining two LEDs emit red light $6_3$. In FIG. 2(d), a configuration comprised of 5 LEDs, a first LED emitting white light $6_1$, a pair of LED emitting red light $6_3$ and a second pair of LEDs emmitting infra-red $6_4$ is disclosed. In FIG. 2(e), an alternative configuration comprised of 5 LEDs, a first. LED emitting white light $6_1$, a pair of LED emitting red light $6_3$ and a second pair of LEDs emitting blue light $6_2$ is disclosed. Finally, in FIG. 2(f) a configuration of 9 LEDS is disclosed, three LEDs emitting white light $6_1$, and a pair each of LEDs emitting blue light $6_2$, red light $6_3$ and infra-red $6_4$ is disclosed.

It will be apparent to one of ordinary skill in the art that the above configurations are provided by way of example only and are not to be considered limiting. For example, LEDs which emit a given colour of light could be exchanged for LEDs which emit a different colour of light, including white, blue, green, red or orange/amber. Also known in the art are RGB LED devices comprised of 3 LEDs encased in a single package which can emit light of a variety of colours. Additionally, for a given application LEDs emitting light in the visible spectrum could be exchanged for those emitting radiation in non-visible bands of the spectrum including infra-red and ultra-violet, thermal emitters and other emitting devices as described hereinabove.

Figure 3:
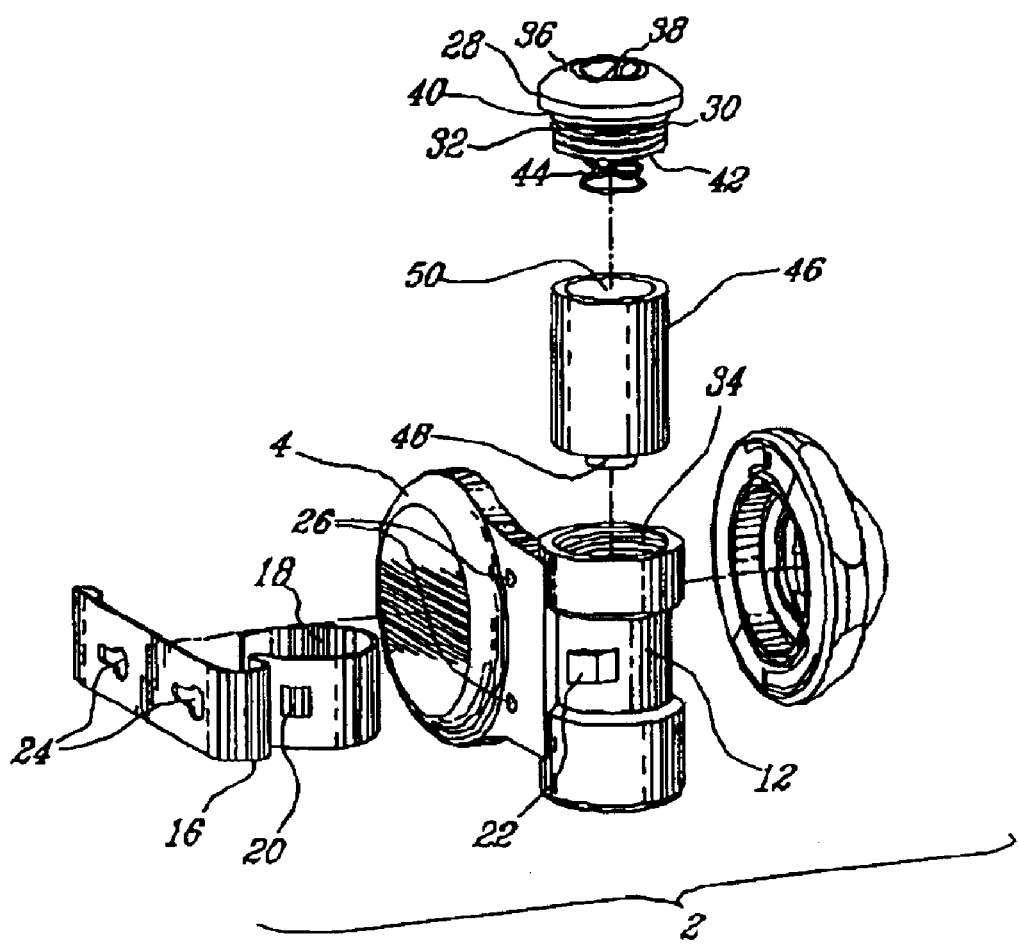
FIG. 3 is an exploded rear perspective view of a multi-mode electromagnetic radiation emitting device in accordance with an illustrative embodiment of the present invention.

Referring now to FIG. 3, a clip 16 manufactured from spring steel or the like is advantageously provided for attaching the device 2 to a belt, shirt pocket, hat brim or similar. Illustratively, the clip 16 is removably attached to the device by encircling the compartment 12 with a suitably formed end piece 18 having a slot 20 machined therein. The slot 20 mates with a raised stud 22 formed in the outer surface of the compartment 12 which prevents the clip 16 from being easily removed from device 2. Keyhole slots as in 24 are also machined in the clip 16, into which the heads of a suitably equipped support device (not shown) can be inserted for fastening. Additionally, a pair of holes 26 are bored through the housing 4 allowing, after the removal of the clip 16, for the attachment of adapters (such as a bracket holding a powerful magnet, not shown, for attaching the device 2 to ferrous metal or the like) or for fastening the device 2 to a surface by the means of nails, screws, wire, etc. (all not shown).

Still referring to FIG. 3, access to the compartment 12 which houses the battery is provided via a cap 28 which is fastened to the end of the compartment 12 by means of plug 30 manufactured from a conductive material such as brass and having a thread 32 which mates with a suitably threaded inner surface of the open end 34 of the compartment 12. In the outer end 36 of the cap 28, a slot 38 is fashioned allowing for a small coin or screw driver (both not shown) to be inserted therein to provide ease in opening and closing. In tightening, a rubber O-ring 40 is compressed between the open end 34 of the compartment 12 and cap 28 providing hermetic seal therebetween thus preventing the egress of moisture and the like into'the compartment 12.

Inside surface 42 of the cap 28 is manufactured from a conductive material such as brass and includes a conductive biasing spring 44 which retains a battery 46 securely in the compartment 12 by biasing the cathode (positive end) 48 or anode (negative end) 50 of the battery 40, depending on orientation, against the far conductive wall (not shown) of the compartment 12. Note that, although the compartment 12 of the present embodiment has been designed for accepting a 3 volt lithium battery such as the one with the designation CR17345 (CR123A ), it is well within the scope of the present invention for other types of batteries or DC power sources to be used, including battery packs comprised of more than one cell and external transformers, with the appropriate modifications to the device 2.

Figure 4A:
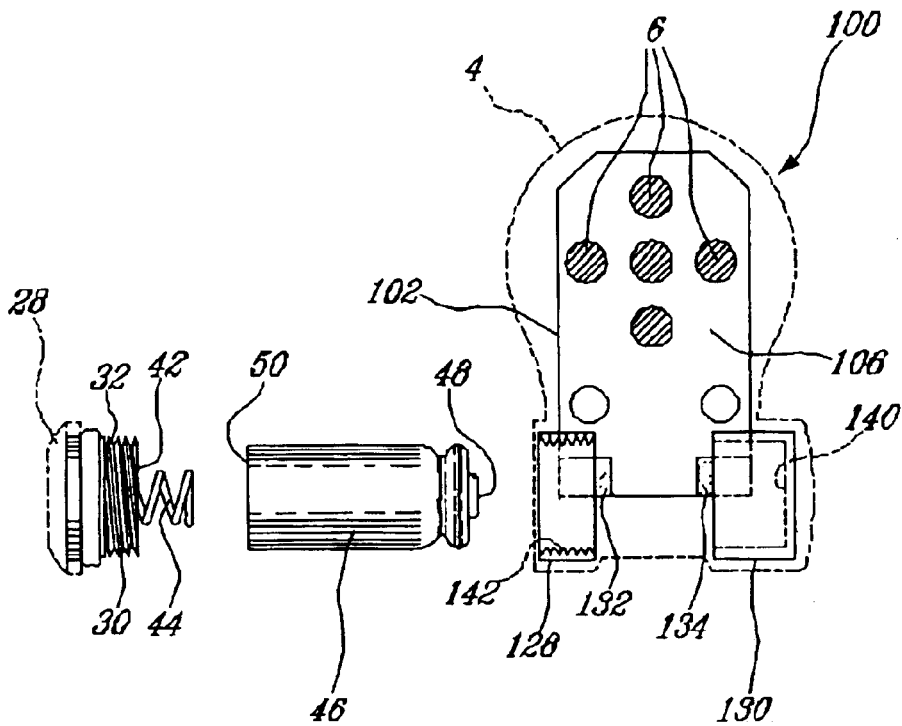
FIG. 4a is a front plan view of the electronics of a multi-mode electromagnetic radiation emitting device in accordance with an illustrative embodiment of the present invention.
Figure 4B:
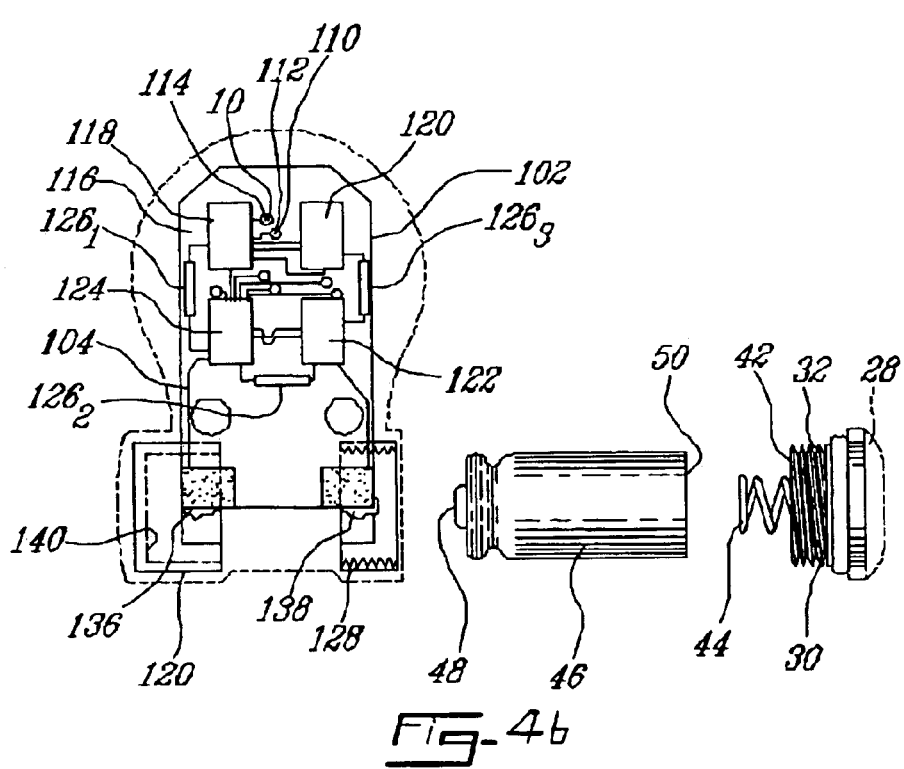
FIG. 4b is a rear plan view of the electronics of a multi-mode electromagnetic radiation emitting device in accordance with an illustrative embodiment of the present invention.

Referring now to FIGS. 4a and 4b, an illustrative embodiment of the electronics 100 which operate the device 2 will be disclosed. During fabrication, the electronics 100 are encapsulated within the housing 4 which provides a protective casing for the electronics 100, preventing the egress of moisture and the like. The electronics are comprised of a PC Board (PCB) 102 onto which have been etched a number of conductive traces as in 104. It will be understood that traces as in 104 can be etched on both sides of the PCB 102. Additionally, in order to increase connectivity and the density of components on the PCB's surfaces a multi-layer PCB design could also be used.

The LEDs 6 are mounted on the front surface 106 of the PCB 102, typically by inserting the anode 108 and cathode 110 of each LED 6 through a pair of perforations as 112 machined in the PCB 102. A conductive pad as in 114 surrounding each perforation is mounted on the back surface 116 of the PCB 102. The LEDs 6 are held in place by applying a small bead of solder to the anode 108 and cathode 110 which provides a conductive path between the anode 108 and cathode 110 and the conductive pads 114 surrounding the perforations. Each conductive pad 114 is in turn in electrical contact with one or more traces 104.

Attached to the back surface 116 are one or more integrated circuits (ICs) such as a microprocessor 118. Read Only Memory (ROM) 120, Electrically Erasable Programmable Read Only Memory (EEPROM) 122 and LED drivers 124. In a particular embodiment, and as will be discussed below, an external interface (not shown) is also provided for Other electronic components may also be included as required such as individual transistors, oscillators, resistors, capacitors and the like. Additionally, an array of reed switches $126_1$, $126_2$, and $126_3$ are provided which indicate to the microprocessor 118 the position of the rotary switch (not shown). A variety of methods can be used to attach the ICs and other components to the PCB, for example surface mounting and flip-chip bonding techniques. It should be understood that, although the present invention is described using reference to EEPROMs, the use of other types of programmable memory, such as Random Access Memory (RAM), Programmable Logic Arrays (PLAs), Field Programmable Gate Arrays (FPGAs), etc. is within the scope of the present invention.

As stated above, power for the electronics is provided by a battery 46. Contact between the cathode 48 and anode 50 of the battery 46 and the PCB 102 is provided by a pair of receptacles 128 and 130, manufactured from a conductive material such as brass, which are mounted on the PCB 102 by attaching them to one of two large contact pads 132, 134 with conductive solder. In order to improve contact with contact pads 132, 134 the receptacles 128, 130 have a flat region 136, 138 machined in the outer surface thereof.

During operation, the battery 46 is inserted through the ring shaped receptacle 128 and positioned in the cup shaped receptacle 130 with the cathode 48 (or anode 50 depending on orientation of the battery 46) butting against the inner surface 140 of the receptacle 130 thereby bringing the anode 48 into electrical contact with the contact pad 134. Ring-shaped receptacle 128 has an inner surface machined with a thread 142. In order to retain the battery 46 in place during operation and provide conductivity between the anode 50 (or cathode 48 depending on orientation of the battery 46) and the ring-like receptacle 128, the conductive plug 30 of the cap 28 is screwed into the thread 142 of the ring-like receptacle 128 such that the conductive biasing spring 44 exerts pressure on the battery 46. As both the conductive plug 30 and the ring-like receptacle 128 are manufactured from a conductive material, in this manner the anode 50 of the battery 46 is brought into electrical contact with the contact pad 132.

Figure 5A:
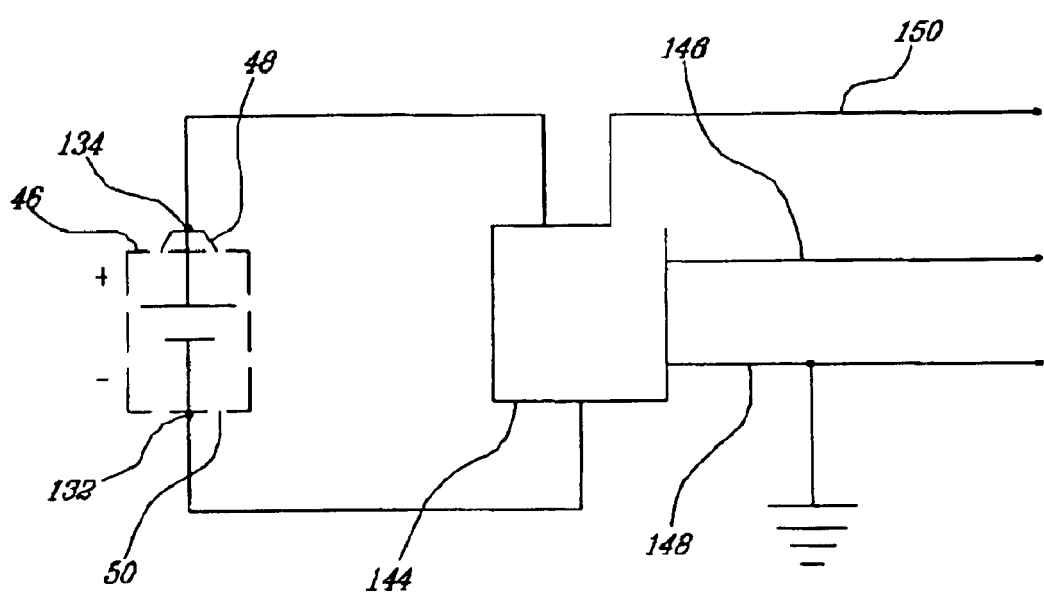
FIG. 5a is a block diagram of the power converter circuit for the multi-mode electromagnetic radiation emitting device in accordance with an illustrative embodiment of the present invention.

Referring now to FIG. 5a, an illustrative embodiment of the power conversion circuit 144 will be described. Power from the battery 46 is input to the power conversion circuit 144, which comprises, for example, a diode bridge as known in the art and, if necessary; a DC/DC converter or other circuits for conditioning the output voltage and current if so required, such as a charge pump, voltage booster, staged voltage multiplier circuit or the like. As known in the art, charge pumps, voltage boosters, staged voltage multiplier circuits and the like are able to generate output voltages which are higher than the input voltage, in its simplest form allowing the voltage to be doubled by driving a circuit comprised of capacitors and diode using a square wave. Other circuits, which are typically in the form of single-chip integrated packages, allow for accurate setting of the output voltage to predetermined values.

Regardless of the orientation of the battery 46, the output of the power conversion circuit 144 is a positive voltage on the positive conductor 146 and a ground 148. In the illustrative embodiment a polarity indicator 150 is set high if the battery 46 is oriented such that the cathode 48 is in contact with contact pad 134, and set low if cathode 48 is in contact with contact pad 132, thereby providing an indication to the electronics as to the orientation of the battery 46.

Figure 6:
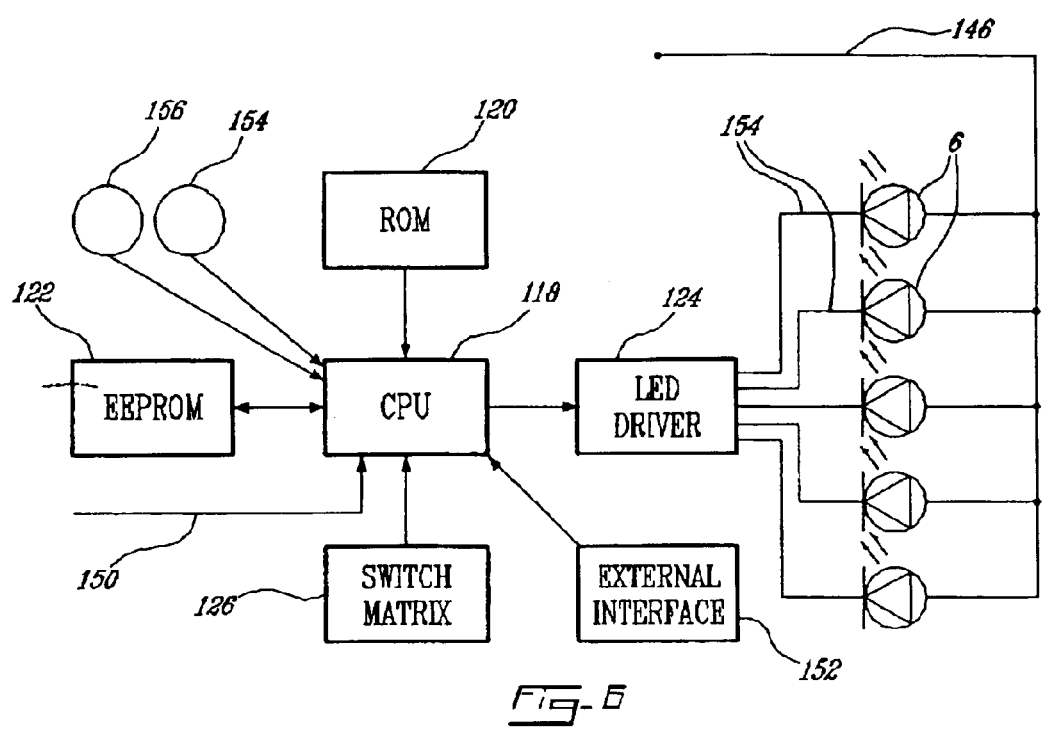
FIG. 6 is a block diagram of the controller circuit for the multi-mode electromagnetic radiation emitting device in accordance with an illustrative embodiment of the present invention.

Referring now to FIG. 6 in addition to FIG. 5a, an illustrative embodiment of the control circuit which drives the LEDs 6 will be described. The control circuit is comprised of the microprocessor (CPU) 118, ROM 120, EEPROM 122, LED Drivers 124 and switches 126 as discussed above. Additionally, an external interface 152 could also be provided. The microprocessor uses instruction sets stored in the ROM 120 or EEPROM 122 to provide control signals to the LED Drivers 124 depending on the switches 126 and, depending on the configuration, the polarity of the battery 46 which is available via polarity indicator 150.

Typically, in order to emit what for the human eye appears to be a steady light the LED drivers 124, based on control signals received from the microprocessor 118, will drive the LEDs 6, either individually or in banks of two or more LEDS, using a square pulse train having a frequency of around 100 Hz. Depending on the instruction set selected, the LEDs 6, and therefore the light emitted by the LEDs 6, can be controlled in a number of ways. For example, the square pulse train driving each of the LEDs 6, or a given bank of LEDs 6, can be selectively turned on and off according to a predefined pattern in order to fulfil a variety of signalling applications, for example causing one or more of the LEDs 6 to flash according to a predefined pattern which corresponds to the well known three short pulse, three long pulse, three short pulse Morse code for SOS, or turning one or more of the LEDs on while the remaining LEDs remain turned off. Additionally, as the intensity of a given LED is in large part related to the average current through the LED and therefore can be adjusted by varying the duty cycle of the pulse, the intensity of one or more of the LEDs 6 can be varied by adjusting the duty cycle of the individual pulse trains. A combination of the above is also foreseeable.

Referring to FIG. 1 in addition to FIGS. 5a and 6, in a first illustrative embodiment of the control circuit, reversing polarity of the battery 46 allows the microprocessor 118 to access a different bank of instruction sets, thereby increasing the number of instruction sets which can be accessed using the rotary switch 14. In this embodiment, the instruction sets used by the microprocessor 118 are stored in two banks of instruction sets located in the ROM 120, with one instruction set in each of the banks corresponding to each active position of the rotary switch 14. The position of the rotary switch 14 is made available to the microprocessor 118 by the switch matrix 126. Similarly, each of the instruction banks corresponds to one of the polarities of the battery 46 and therefore, depending on the polarity of the battery 46, and thus the polarity indicator 150, one or the other of the instruction banks is selected. It will now be apparent to one of ordinary skill in the art that by reversing the battery 46, and therefore the polarity indicator 150, the other instruction bank can be selected.

Note that, although in the present illustrative embodiments reversal of the polarity of the, power source is achieved by manually reversing the battery, other methods for reversing the polarity, such manually reconfiguring the interconnections between the, power source and the electronics, double pole mechanical switches, electronic switches and the like, are within the scope of the present invention.

In a second illustrative embodiment of the control circuit, reversing the polarity of the battery 46 has the effect of placing the device 2 in covert mode. In covert mode, the microprocessor generates control signals which are used to drive one or more of the LEDs 6 such that light in the infrared range only is emitted, according to a stored instruction set selected using the rotary switch 14. Reversing the battery 46 back to its initial position leads to the microprocessor 118 generating control signals (again, according to a stored instruction set selected using the rotary switch 14) such that one or more of the LEDs 6 emits a visible light.

In a third illustrative embodiment of the control circuit, reversing the polarity of the battery 46 has the effect of placing the device 2 in a reprogramming mode.

In a first embodiment of the reprogramming mode, a series of instruction sets used by the microprocessor 118 for controlling the LEDs 6 are stored in the ROM 120. In this embodiment, it is foreseen that one instruction set is available for each active position of the rotary switch 14 per bank of instruction sets, with one bank corresponding to each of the active positions of the rotary switch 14. By rotating the rotary switch 14 to a given position and then reversing the polarity of the battery 46, the microprocessor 118 would write the instruction sets of the bank corresponding to that position of the rotary switch 14 into the EEPROM 122. By once again reversing the battery 46 and rotating the rotary switch 14 to an active position, the instruction set of the instruction sets written into EEPROM 122 which corresponds to the current position of the rotary switch 14 would be used by the microprocessor 118 to generate control signals to the LED drivers 124.

In a second embodiment of the reprogramming mode, reversal of the polarity of the battery 46 activates the external interface 152 and allows the microprocessor 118 to overwrite instruction sets stored in the EEPROM 122 with new instruction sets received via the external interface 152. As known in the art, a variety of potential external interfaces could be used by the control circuit for receiving new instruction sets are possible including a hardware interface such as a serial interface, an infra-red interface such as an IrDA compatible interface, a scanner such as a barcode reader, etc. By once again reversing the battery 46 and rotating the rotary switch 14 to an active position, the instruction set of the instruction sets written into EEPROM 122 which corresponds to the current position of the rotary switch 14 is used by the microprocessor 118 to generate control signals to the LED drivers 124.

In a forth illustrative embodiment of the control circuit, reversing the polarity of the battery 46 has the effect of placing the device 2 in night activated mode. When night activated, a photosensitive device 154 comprising, for example a photo diode provides an indication to the microprocessor 118 as to when the level of ambient light drops below a predetermined threshold. As long as the level of light incident on the photo diode is above the predetermined threshold, no control signals for driving the LEDs 6 are generated by the microprocessor 118. When the level of light incident on the photo diode drops below the predetermined threshold the instruction set which corresponds to the current position of the rotary switch 14 is used by the microprocessor 118 to generate control signals to the LED drivers 124. By once again reversing the battery 46 the device 2 can be activated in the usual manner and the instruction set which corresponds to the current position of the rotary switch 14 is used by the microprocessor 118 to generate control signals to the LED drivers 124.

In a fifth illustrative embodiment of the control circuit, reversing the polarity of the battery 46 has the effect of placing the device 2 in water activated mode. When water activated, a water sensitive device 156 provides an indication to the microprocessor 118 when the water sensitive device 156 is immersed in fresh or salt water. As long as the water sensitive device 156 is not immersed in water, no control signals for driving the LEDs 6 are generated by the microprocessor 118. When the water sensitive device 156 is immersed in water the instruction set which corresponds to the current position of the rotary switch 14 is used by the microprocessor 118 to generate control signals to the LED drivers 124. By once again reversing the battery 46, the device 2 can be activated in the usual manner, and the instruction set which corresponds to the current position of the rotary switch 14 is used by the microprocessor 118 to generate control signals to the LED drivers 124.

Figure 5B:
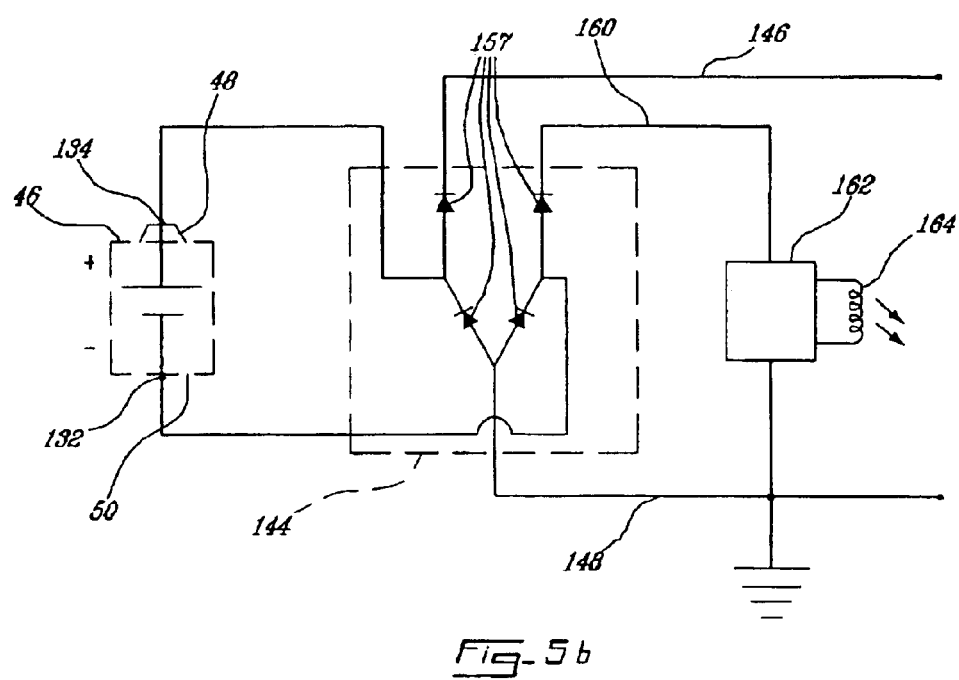
FIG. 5b is a block diagram of a power converter circuit for the multi-mode electromagnetic radiation emitting device in accordance with an alternative illustrative embodiment of the present invention.

Referring to FIG. 5b, a second illustrative embodiment of the power conversion circuit 144 combined with a sixth illustrative embodiment of the control circuit will now be described. In this embodiment, reversing the polarity of the battery 46 has the effect of powering up a separate control circuit. The core of the power conversion circuit 144 is a diode bridge comprised of a series of diodes as in 157 in an open bridge configuration. With the battery 46 positioned with the cathode 48 in contact with the contact pad 134, a positive potential will be available between the positive conductor 146 and ground 148 which may be used to power, for example, a microprocessor controlled circuit for driving the LEDs as disclosed and described in reference to FIG. 6. Of course, it makes no sense to provide an indication of the polarity of the battery 46 as a control input to the microprocessor as in this embodiment the microprocessor will only be powered up when the cathode 48 of the battery 46 is in contact with the contact pad 134. As a result, the polarity indicator 150 can be done away with. At the same time, second positive conductor 160 is tied to ground 148 thereby deactivating any circuit placed between the second positive conductor 160 and the ground 148.

Still referring to FIG. 5b, with the battery reversed such that the cathode 48 is in contact with the contact pad 132, a positive potential is available between the second positive conductor 160 and ground 148 which may be used to power second control circuit 162. At the same time positive conductor 146 will be set to the ground 148 deactivating any circuit placed between the positive conductor 146 and the ground 148. The second control circuit 162 can be used, for example, to drive different electronics and/or light emitting devices, such as a high intensity xenon strobe 164.

Figure 7:
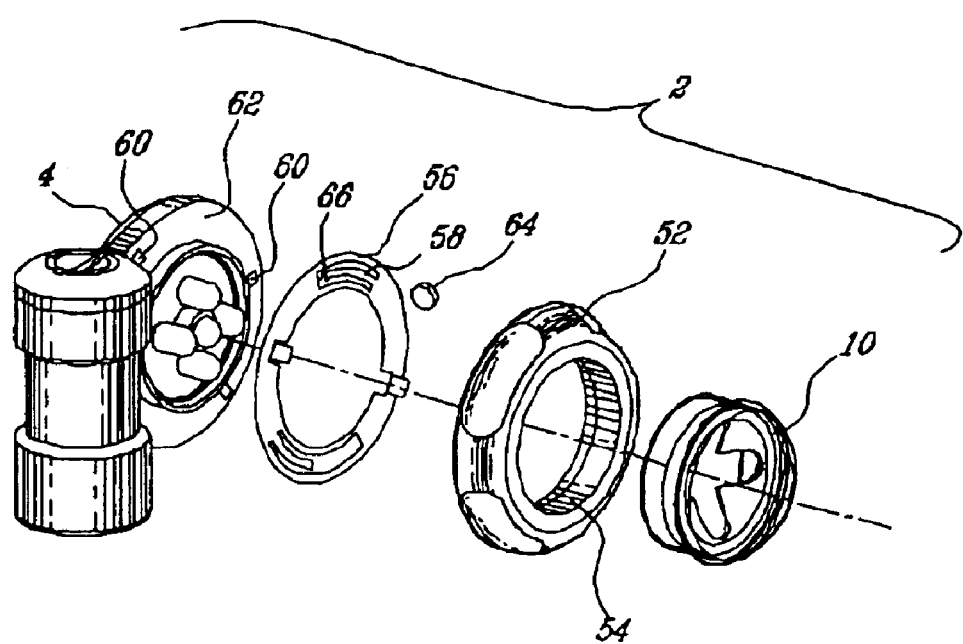
FIG. 7 is an exploded front perspective view of the multi-mode electromagnetic radiation emitting device in accordance with an illustrative embodiment of the present invention.

Referring now to FIG. 3 and FIG. 7, a first illustrative embodiment of a rotary switch mechanism for use with the multi-mode electromagnetic radiation emitting device 2 is disclosed. The rotary switch 14 is comprised of a circular actuator 52 having an aperture 54 therein through which the lens cap 10 is mounted such that the actuator 52 can rotate freely about the lens cap 10. In this manner, the lens cap 10 serves not only to protect the LEDs 6 encased within but also serves to retain, through suitably designed mating surfaces, the actuator 52 in proximate relationship to the housing 4 and the electronics encased within the housing 4.

The rotary switch 14 further comprises a ratchet mechanism for maintaining the actuator 52 in a given position. The ratchet mechanism is comprised of an annular ratchet ring 56 rigidly fixed the actuator 52 and moving as one therewith. The ratchet ring 56 comprises a series of flexible raised tabs 58, distributed evenly around the ring 56, formed therein. The ratchet ring 56 is typically manufactured from a resilient flexible material such as spring stainless steel. The tabs 58, which mate with a corresponding series of spaced depressions, 60 machined on the inside face 62 of the housing 4, are held in proximate relationship to the inside face 62 of the housing 4 by the interaction between the lens cap 10, which is attached to the inside face 62, and the actuator 52. When aligned, the flexible tabs 58 insert themselves into the depressions 60 thereby providing resistance against rotation of the actuator 52. In this manner the actuator 52 can provide tactile feedback to the user as to when the actuator is in a given predetermined switch position.

Additionally, however, the tactile feedback could be replaced or supplemented by an audio signal, for example a click, indicating that the actuator is in a given predetermined switch position. Of course, the requisite electronics would have to be implemented for generating the audio signal, for example by means of a piezo-electric transducer mounted on the PCB 102, with appropriate changes made to the traces on the PCB 102 and the software which drives the microprocessor 118 in order to generate an audio signal when a given switch position is reached.

In the present illustrative embodiment, one tab 58/depression 60 pair is provided for each position of the rotary switch 14. It will now be apparent to one of ordinary skill in the art that by suitably designing the tabs 58 and depressions 60, a rotary switch mechanism can be provided which is either capable of rotation in both clockwise and counter clockwise directions or limited to rotation in one of these directions.

Additionally, in a particular embodiment for actuating switches which are sensitive to magnetic fields, a small magnet 64 is mounted in the actuator 54. In this embodiment a slot 66 is cut in the metallic ratchet ring 56 in proximity to the magnet 64 in order to reduce any effects the metallic ratchet ring 56 may have on the strength of the magnetic field.

Figure 8A:
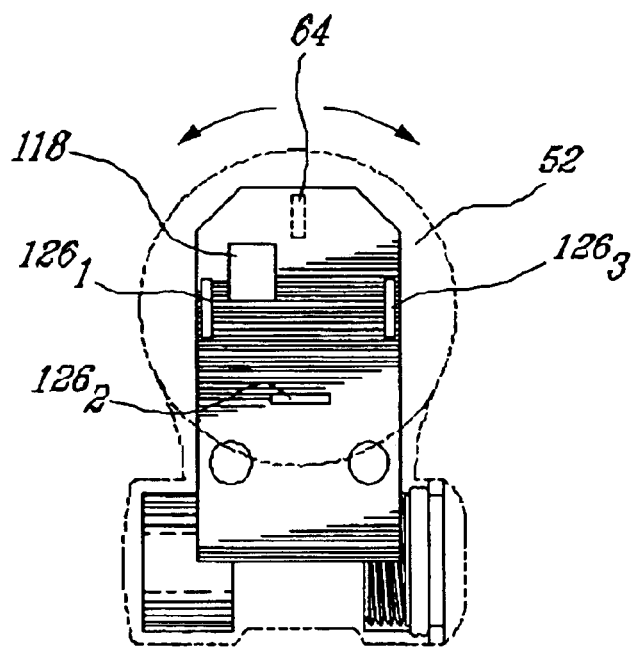
FIG. 8a is a rear plan view of a first embodiment of the switching electronics for the multi-mode electromagnetic radiation emitting device in accordance with an illustrative embodiment of the present invention.

Referring now to FIG. 8a, as discussed above, an array of normally open (non-conducting) reed switches as in $126_1$, $126_2$, and $126_3$ is provided to indicate to the microprocessor 118 the position of the rotary switch 14. As known in the art, reed switches consist of two sets of conductive contacts hermetically sealed in a glass tube. Manufactured from a ferrous material, for example a nickel iron wire which has been flattened and plated with a highly conductive material such as gold, the conductive contacts deflect when in the presence of a magnetic field. Provided the deflection is adequate; the contacts are brought into contact with one another thereby allowing electric current to flow therebetween. In order to operate the reed switches, as discussed above a small magnet 64 is mounted in the actuator 54. As the actuator 54 is rotated away from the deactivated position, which in this embodiment is not associated with a reed switch, the magnet 64 is positioned opposite one of the reed switches $126_1$, $126_2$, and $126_3$ thereby completing an electrical circuit via the reed switch in question which is provided as an input to the microprocessor 118. In the present illustrative embodiment, completing the electrical circuit via one of the reed switches has the effect of powering up the electronics while at the same time providing an indication as to the position of the rotary switch 14.

It will be understood by a person of ordinary skill in the art that although a rotary switch mechanism with four (4) positions is shown, this could easily be extended to eight (8) positions or more with the provision of additional reed switches and a suitably redesigned ratchet mechanism.

Figure 8B:
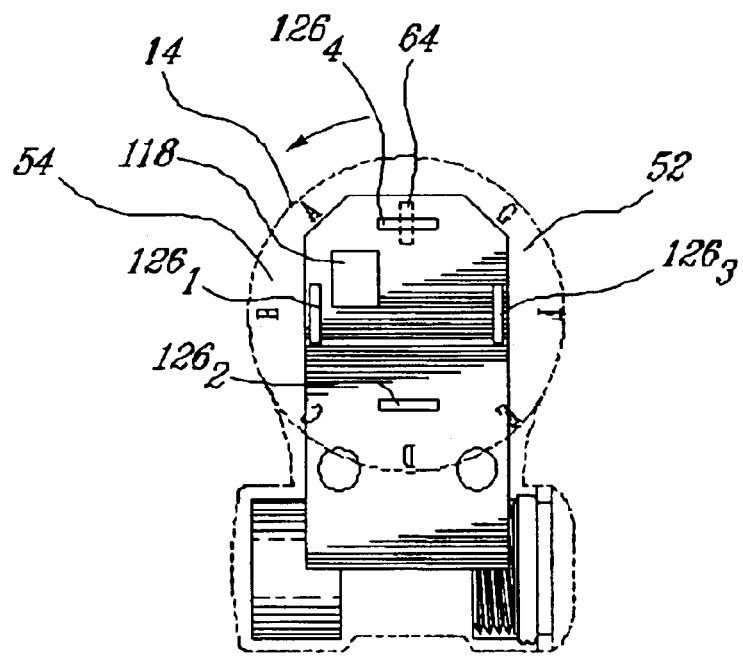
FIG. 8b is a rear plan view of a second alternative embodiment of the switching electronics for the multi-mode electromagnetic radiation emitting device in accordance with an illustrative embodiment of the present invention.

Referring now to FIG. 8b, a second alternative embodiment of a rotary switch mechanism for use with the multi-mode electromagnetic radiation emitting device 2 is disclosed. In this embodiment the rotation of the rotary switch 14 is limited to the counter clockwise (or clockwise, if so implemented) direction. An additional reed switch $126_4$ is also provided. The rotary switch 14 in this embodiment has twice as many positions as reed switches 126 (in the illustrated embodiment eight (8) positions, including an deactivated position. In the deactivated position as shown the magnet 64 is proximate to a normally closed reed switch $126_4$, the reed switch $126_4$ thus held open by the presence of the magnet 64 thereby stopping electrical energy from circulating through the electronics, which has the advantage that placing the device 2 close to other magnetic sources will not cause false triggering of the electronics via one or more of the remaining reed switches $126_1$, $126_2$, or $126_3$.

As the actuator 54 is rotated, and the magnet 64 moved away from the deactivated position, the forth reed switch $126_4$ closes thereby powering up the electronics. As the actuator 54 is further rotated, the magnet 64 finds itself in the first intermediate position, marked by the reference A on FIG. 8b. At this point the microprocessor 118 is aware that the actuator 54 has been rotated, and that the magnet 64 has not passed the forth reed switch $126_4$, and as a result can determine that the magnet 64 is indicating position A, thereby allowing this to be used as an input to any operations the microprocessor 118 carries out. As the actuator 54 is rotated farther the magnet 64 is brought into proximity of the normally open second reed switch $128_2$ at position B, thereby causing it to close and completing an electrical circuit. The microprocessor 118 is now aware that the actuator 54 has been rotated and that the magnet 64 is at position B, thereby allowing this to be used as an input to any operations the microprocessor 118 carries out. As the actuator 54 is rotated even farther the magnet 64 is placed at position C, in between the first reed switch $126_1$ and the second reed switch $126_2$. By retaining a memory that the first read switch $126_1$ has been passed, for example using memory available to the microprocessor or flip-flops attached the outputs of the reed switches $126_1$, $126_2$, or $126_3$, the location of the magnet 64 at position C can be determined thereby allowing this to be used as an input to any operations the microprocessor 118 carries out. Similar operations are performed at positions D, E, F and G before the magnet 64 is returned to the deactivated position an the supply of power to the electronics terminated.

Figure 8C:
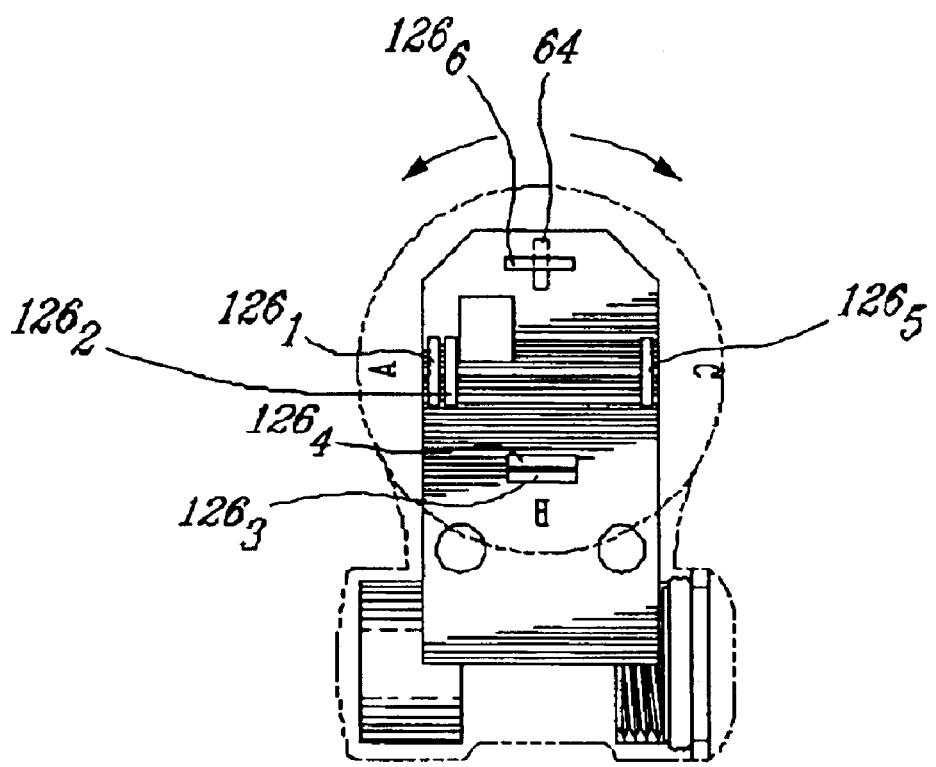
FIG. 8c is a rear plan view of a third alternative embodiment of the switching electronics for the multi-mode electromagnetic radiation emitting device in accordance with an illustrative embodiment of the present invention.

Referring now to FIG. 8c, a third alternative embodiment of a rotary switch mechanism for use with the multi-mode electromagnetic radiation emitting device 2 is disclosed. In this embodiment, the actuator 54 has four positions around the dial: one deactivated position; and three active positions indicated by A, B, and C. In this embodiment two reed switch $126_1$ and $126_2$ are dedicated to position A, two reed switches $126_3$ and $126_4$ are dedicated to position B and one reed switch $126_5$ is dedicated to position C. Optionally, and in a given implementation, a $6^{th}$ normally open reed switch $126_6$ could also be included in the deactivated position, the reed switch $126_6$ being held open by the presence of the magnet 64 thereby stopping electrical energy from circulating through the electronics.

Figure 8D:
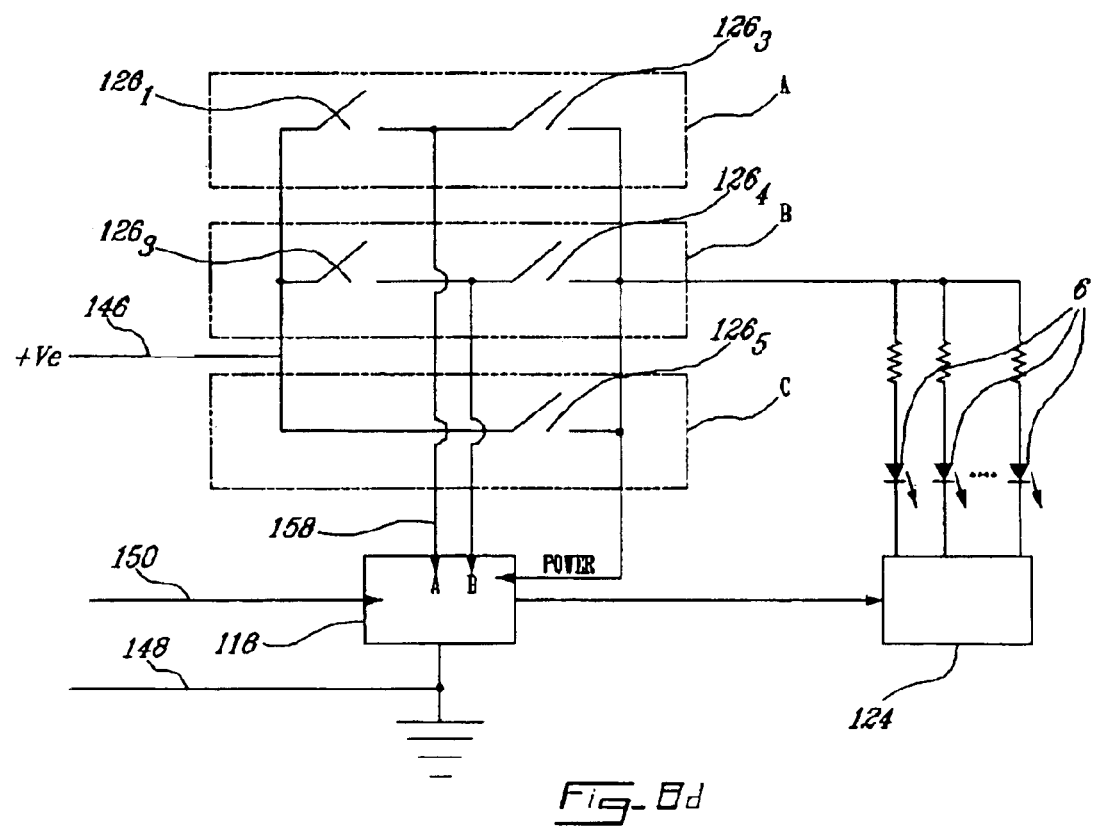
FIG. 8d is a block diagram of a third alternative embodiment of the switching electronics for the multi-mode electromagnetic radiation emitting device in accordance with an illustrative embodiment of the present invention.
Figure 8P:
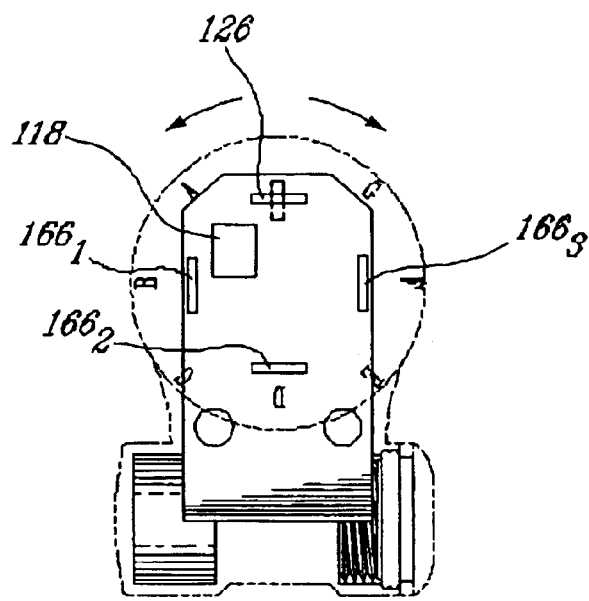
FIG. 8e is a rear plan view of a forth alternative embodiment of the switching electronics for the multi-mode electromagnetic radiation emitting device in accordance with an illustrative embodiment of the present invention.

Referring now to FIG. 8d in addition to FIG. 8c, when the actuator 54 is positioned such that the magnet 64 is located in position A, reed switches $126_1$ and $126_2$ are closed. At this point power available on positive conductor 146 is fed to the microprocessor 118. At the same time input A to the microprocessor 118 is set high via the switch A status conductor 158 as well as an indication of the polarity of the battery via the polarity indicator 150. The microprocessor can then use these inputs to take appropriate actions, for example to generate control signals according to a predetermined set of instructions for transfer to the LED drivers 124 for driving one or more of the LEDs 6. Moving the switch so that the magnet 64 moves away from position A causes reed switches $126_1$ and $126_2$ to open thereby deactivating the device. At position B, reed switches $126_1$ and $126_2$ are closed and a similar series of actions take place as for position switch A as discussed above. Similar actions are also carried out when the magnet 64 is moved from position B to C or back to position A. In position C, however, as both input A and B are low, the microprocessor 118 position C can be implemented using a single reed switch $126_5$.

In an alternative embodiment, the reed switches could be replaced or combined with other suitable mechanical switches or electronic devices such as Hall effect sensors. As known in the art, Hall effect sensors are semiconductor devices which generate a variable voltage when in the presence of a magnetic field. By positioning the Hall effect sensors on the back surface 116 of the PCB 102 in positions similar to those of the reed switches, the presence of the magnet mounted in the rotary switch in proximity to the Hall effect sensor can be detected. Alternatively, Hall effect sensors could be placed at intermediate positions between the reed switches. This information can then be provided to the microprocessor 118.

Referring now to FIG. 8e, a forth alternative embodiment of a rotary switch mechanism for use with the multi-mode electromagnetic radiation emitting device 2 is disclosed. In this embodiment reed switches are replaced by Hall effect sensors $166_1$, $166_2$, and $166_3$ with, for example, a normally closed reed switch 126 in the deactivated position. As the actuator 54 is rotated, and the magnet 64 moved away from the deactivated position, the normally closed reed switch 126 closes, thereby powering up the electronics. As the magnet is moved into the first position, indicated by a B, the Hall effect sensor 166, senses the presence of the magnet 64, which information is provided to the microprocessor 118 to indicate the position of the rotary switch 14. A similar sequence of invents is carried out as the actuator 54 is further rotated to bring the magnet 64 into positions D and F.

Still referring to FIG. 8e, intermediate positions A, C, E and G could also be sensed by replacing the Hall effect sensors $166_1$, $166_2$, and $166_3$ with dual polarity Hall effect sensors. Aligned with the direction of travel of the magnet 64, these Hall effect sensors can sense the direction in which the magnet 64 is moving. For example, if the magnet 64 is currently at position B and the actuator 54 is rotated in the clockwise direction, the dual polarity Hall effect sensor $166_1$ can provide an indication to the microprocessor 118 that the magnet is moving away from position B and into position C. This information can then be used as an input to any operations the microprocessor 118 carries out, for example control signals to the LED drivers (not shown) for driving the LEDs according to a particular sequence.

Figure 9A:
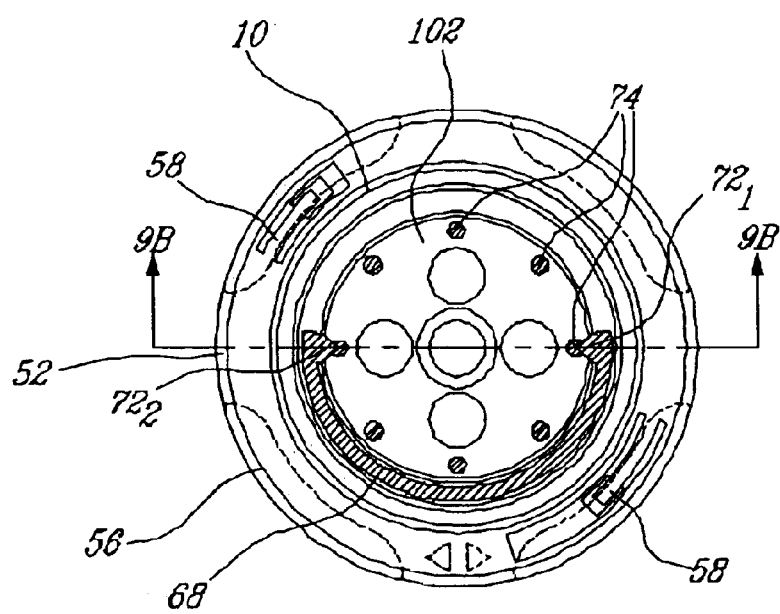
FIG. 9a is a top plan view of a mechanical rotary switch mechanism in accordance with an illustrative embodiment an illustrative embodiment of the present invention.
Figure 9B:
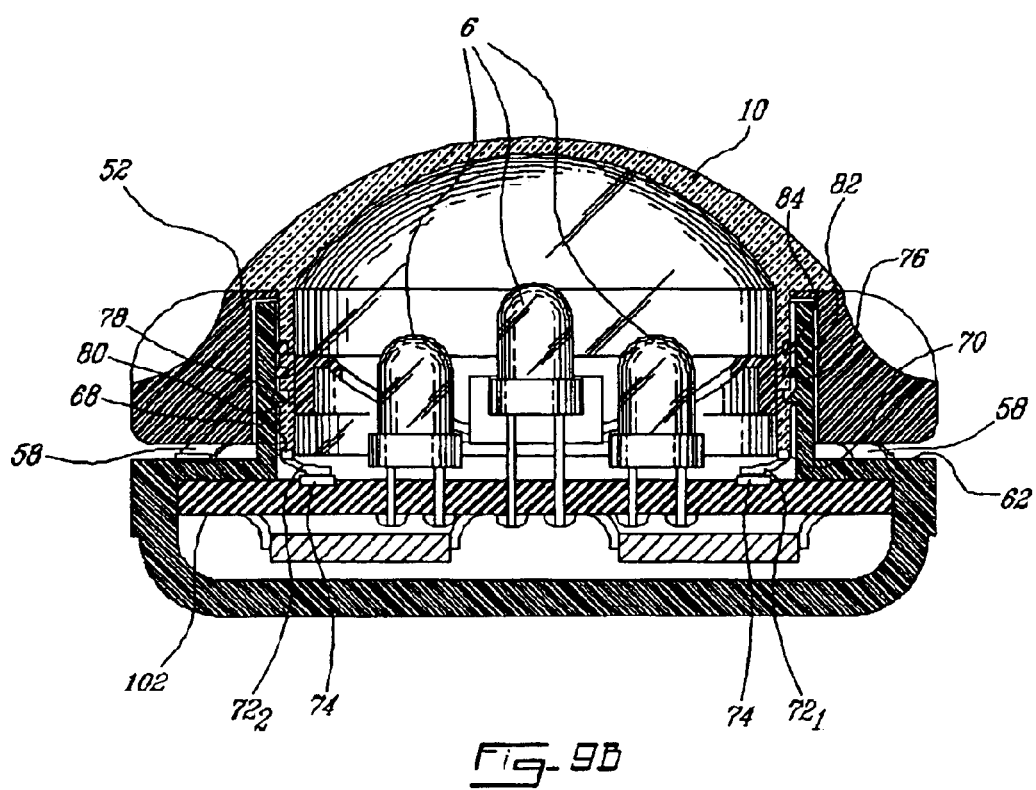

Referring to FIGS. 9a and 9b, an embodiment of a mechanical rotary switch mechanism in accordance with an illustrative embodiment of the present invention is disclosed. In this embodiment, a contact element comprised of a ring (or half ring) 68 fabricated from an electrically conductive material such as nickel plated brass, is imbedded in a lower end 70 of the lens 10. The ring 68 includes a pair of flexible electrically interconnected (by the conductive ring 68) conductive tabs $72_1$, $72_2$ which descend below the lower end 70 of the lens 10 and make contact with a, series of contact pads 74 etched or otherwise adhered to the surface of the PCB 102. The lens 10 is attached by clips, an adhesive or otherwise bonded to the actuator 52, therefore as actuator 52 rotates, the lens 10 rotates causing the conductive tabs $72_1$, $72_2$ to move between pairs of conductive pads 74. When the conductive tabs $72_1$, $72_2$ come into contact with a pair of contact pads 74, an electrical circuit is completed via the ring 68 which is used to power up the electronics 100 and provide information to the electronics as to the current position of the actuator 52, which then power up and drive the LEDs 6 according to the function selected via the actuator.

Referring to FIG. 9a, in order to accommodate the alternative switch assembly by providing support for the lens 10 and actuator 52, there is included a raised cylindrical support boss 76 on the inside face 62 of the housing 4. The support boss 76, which acts like a hub around which the actuator 52 rotates, includes an inside facing annular bearing surface 78 on an inner surface thereof. The bearing surface 78 mates with a corresponding outside facing annular shoulder 80 on an outside surface of the lens 10, thereby holding the lens 10 in place once the lens 10 is snapped over the support boss 76. In order to maintain a hermetic seal between the inside of the lens 10 and the surrounding environment, a pair of O-rings 82, 84 are provided for preventing the egress of moisture, sand, salt and the like. The annular ridges 78, 80 are kept in contact by the ratchet ring 56/raised tabs 58 assembly which biases the actuator 52, and therefore the lens 10, away from the inside face 62 of the housing 4.

Note that in all the above embodiments a time delay of several hundred milliseconds before the LEDs are illuminated is also typically built into the electronics. This allows the user to traverse a number of intermediate switch settings with activating the device before arriving at the wished for setting, which is then activated once the switch remains stationary at that position for at least the foreseen time delay.

Referring now back to FIG. 1, in order to provide access to a number of alternative enhanced functions, a series of buttons as in $86_1$, $86_2$ are arranged around the periphery of the housing 4. By depressing these buttons a number of additional functions can be accessed. For example, by activating the device 2 by rotating the switch 14 to an active position and depressing button $86_1$, the intensity of the LEDs 6 can be varied from low intensity to high intensity. By rotating the switch 14 to another setting, the program by which the LEDs 6 are illuminated would vary, but the intensity of the LEDs 6 would remain the same. Alternatively, by activating the device 2 by rotating the switch 14 to an active position and depressing button $86_2$, the device 2 can be moved from visual to covert mode where only infrared LEDs are illuminated. Once again, by rotating the switch 14 to another setting, the program by which the LEDs are illuminated would vary, but the device 2 would remain in convert mode until button $86_2$ is once again depressed. Alternatively, by activating the device 2 by rotating the switch 14 to an active position and depressing a third button (not shown), different colours of LEDs can be selected for each signalling mode. For example, if the device 2 is made up of three banks of LEDs, one bank emitting red light, one blue light and one white light, by depressing the third button the bank which is illuminated according to the program selected using switch 14 can be varied. Once again, by rotating the switch 14 to another setting, the program by which the LEDs are illuminated would vary, but colour of light emitted would remain the same until the third button is once again depressed.

Although the present invention has been described hereinabove by way of an illustrative embodiment thereof, this embodiment can be modified at will, within the scope of the present invention, without departing from the spirit and nature of the subject of the present invention.

What is claimed is:

1. A multi-mode electromagnetic radiation emitting device, comprising:
   an emission module comprising at least one electromagnetic radiation emitting source, a first terminal, a second terminal and a polarity responsive controller interposed between said electromagnetic radiation emitting sources and said first and second terminals;
   a DC power source comprising a positive terminal and a negative terminal; and
   a polarity switch for selectively defining either interconnections between (a) said first and positive terminals and (b) said second and negative terminals, or interconnections between (a) said first and negative terminals and (b) said second and positive terminals;
   wherein the polarity responsive controller comprises:
      a first bank of instructions and a second bank of instructions, each of said first and second banks comprising at least two predetermined sets of signalling instructions;
      a switch for selecting a first set of instructions from said sets of instructions in said first bank and a second set of instructions from said second bank;
      a first power supply circuit activated by the, interconnections between (a) said first and positive terminals and (b) said second and negative terminals, and supplying, when activated, power from said DC power source to said electromagnetic radiation emitting sources according to said first set of instructions, thereby causing said sources to emit electromagnetic radiation according to said first set of instructions; and a second power supply circuit activated by the interconnections between (a) said first and negative terminals and (b) said second and positive terminals, and supplying, when activated, power from said DC power source to said electromagnetic radiation emitting sources according to said second set of instructions, thereby causing said sources to emit electromagnetic radiation according to said second set of instructions.

2. The multi-mode electromagnetic radiation emitting device of claim 1, wherein said DC power source is a battery and wherein said polarity switch comprises manually reversing said battery to change the interconnections between the first, second, positive and negative terminals.

3. The multi-mode electromagnetic radiation emitting device of claim 2, wherein said battery is selected from the group consisting of A, AA, AAA, C, D, N-Cell, 9V and Lithium.

4. The multi-mode electromagnetic radiation emitting device of claim 1, wherein at least one of said electromagnetic radiation emitting sources emits electromagnetic radiation in the visible spectrum.

5. The multi-mode electromagnetic radiation emitting device of claim 1, wherein at least one of said electromagnetic radiation emitting sources emits electromagnetic radiation in the infra-red spectrum.

6. The multi-mode electromagnetic radiation emitting device of claim 1, comprising at least two electromagnetic radiation emitting sources wherein at least one of said electromagnetic radiation emitting sources emits electromagnetic radiation in the visible spectrum and at least one of said electromagnetic radiation emitting sources emits electromagnetic radiation in the infra-red spectrum.

7. The multi-mode electromagnetic radiation emitting device of claim 1, wherein said electromagnetic radiation emitting sources are selected from the group consisting of LEDs, lasers, incandescent lights, thermal emitters, xenon strobes and combinations thereof.

8. The multi-mode electromagnetic radiation emitting device of claim 1, wherein said switch is a multi-position switch comprising n active positions and wherein each of said first bank and said second bank have n predetermined sets of signalling instructions, one of each of said n predetermined sets corresponding to one of said n active positions.

9. The multi-mode electromagnetic radiation emitting device of claim 8, wherein said switch is a multi-position switch comprising an additional deactivated position and wherein when said switch is in said deactivated position none of said electromagnetic radiation emitting sources emit electromagnetic radiation.

10. The multi-mode electromagnetic radiation emitting device of claim 9, wherein said multi-position switch is a bezel mounted rotary switch comprising one (1) deactivated position and at least three (3) active positions.

11. The multi-mode electromagnetic radiation emitting device of claim 10, wherein said rotary switch comprises at least seven (7) active positions.

12. The multi-mode electromagnetic radiation emitting device of claim 8, wherein said switch is a unidirectional multi-position rotary switch comprising a deactivated position, at least one first active positions wherein said electromagnetic radiation emitting sources emit electromagnetic radiation in the infra-red spectrum, and at least one second active positions wherein said electromagnetic radiation emitting sources emit electromagnetic radiation in the visible spectrum, and wherein when said rotary switch is rotated away from said deactivated position said first active positions are activated before said second active positions.

13. A multi-mode electromagnetic radiation emitting device, comprising:
an emission module comprising at least one electromagnetic radiation emitting source, a first terminal, a second terminal and a polarity responsive controller interposed between said electromagnetic radiation emitting sources and said first and second terminals;
a DC power source comprising a positive terminal and a negative terminal; and
a polarity switch selectively defining either interconnections between (a) said first and positive terminals and (b) said second and negative terminals, or interconnections between (a) said first and negative terminals and (b) said second and positive terminals;
wherein the polarity responsive controller comprises:
a set of signalling instructions;
a power supply circuit activated by the interconnections between (a) said first and positive terminals and (b) said second and negative terminals, and supplying, when activated, power from said DC power source to said electromagnetic radiation emitting sources according to said set of signalling instructions, thereby causing said sources to emit electromagnetic radiation according to said set of instructions; and
a reprogramming circuit activated by the interconnections between (a) said first and negative terminals and (b) said second and positive terminals, and replacing, when activated, said set of signalling instructions with a new set of signalling instructions, thereby reprogramming the device.

14. The multi-mode electromagnetic radiation emitting device of claim 13, further comprising an external interface and wherein said new set of signalling instructions is provided by said external interface.

15. The multi-mode electromagnetic radiation emitting device of claim 14, wherein said external interface is a physical interface.

16. The multi-mode electromagnetic radiation emitting device of claim 14, wherein said external interface is an infra-red interface.

17. A reprogrammable multi-mode electromagnetic radiation emitting device, comprising:
an emission module comprising at least one electromagnetic radiation emitting source, a first terminal, a second terminal and a polarity responsive controller interposed between said electromagnetic radiation emitting sources and said first and second terminals;
a DC power source comprising a positive terminal and a negative terminal; and
a polarity switch selectively defining either interconnections between (a) said first and positive terminals and (b) said second and negative terminals, or interconnections between (a) said first and negative terminals and (b) said second and positive terminals;
wherein the polarity responsive controller comprises:
an instruction bank comprising a plurality of sets of signalling instructions;
a switch for selecting a set of instructions from said sets of instructions;
a power supply circuit activated by the interconnections between (a) said first and positive terminals and (b) said second and negative terminals, and supplying, when activated, power from said DC power source to said electromagnetic radiation emitting sources according to said selected set of instructions, thereby causing said sources to emit electromagnetic radiation according to said set of instructions; and
a reprogramming circuit activated by the interconnections between (a) said first and negative terminals and (b) said second and positive terminals, and replacing, when activated, said selected set of signalling instructions with a new set of signalling instructions, thereby reprogramming the device.

18. The reprogrammable multi-mode electromagnetic radiation emitting device as in claim 17, wherein said reprogramming circuit, when activated, replaces said selected set of instructions with said new set of instructions.

19. The reprogrammable multi-mode electromagnetic radiation emitting device as in claim 17, wherein said instruction bank comprises a memory within which said at least two sets of signalling instructions are stored.

20. The reprogrammable multi-mode electromagnetic radiation emitting device as in claim 19, wherein said reprogramming circuit, when activated, overwrites said selected set of instructions with said new set of instructions.

21. A reprogrammable multi-mode electromagnetic radiation emitting device, comprising:
an emission module comprising at least one electromagnetic radiation emitting source, a first terminal, a second terminal and a polarity responsive controller interposed between said electromagnetic radiation emitting sources and said first and second terminals;
a DC power source comprising a positive terminal and a negative terminal; and
a polarity switch selectively defining either interconnections between (a) said first and positive terminals and (b) said second and negative terminals, or interconnections between (a) said first and negative terminals and (b) said second and positive terminals;
wherein the polarity responsive controller comprises:
a plurality of instruction banks, each of said default banks comprising at least one set of signalling instructions
an active instruction bank comprising at least two sets of signalling instructions;
a switch for selecting one of said sets of instructions of said active instruction bank and for selecting one of said default banks;
a power supply circuit activated by the interconnections between (a) said first and positive terminals and (b) said second and negative terminals, and supplying, when activated, power from said DC power source to said electromagnetic radiation emitting sources according to said selected set of instructions, thereby causing said sources to emit electromagnetic radiation according to said set of instructions; and
a reprogramming circuit activated by the interconnections between (a) said first and negative terminals and (b) said second and positive terminals, and replacing, when activated, said active instruction bank with said selected default bank, thereby reprogramming the device.

22. The reprogrammable multi-mode electromagnetic radiation emitting device as in claim 21, wherein said active instruction bank comprises a memory within which said sets of signalling instructions are stored.

23. The reprogrammable multi-mode electromagnetic radiation emitting device as in claim 21, wherein said default instruction banks each comprise a memory within which said sets of signalling instructions are stored.

24. The reprogrammable multi-mode electromagnetic radiation emitting device as in claim 22, wherein said reprogramming circuit, when activated, overwrites the memory location occupied by said active instruction bank with said selected default bank.

25. The reprogrammable multi-mode electromagnetic radiation emitting device as in claim 22 or 23, wherein said memory is a non-volatile memory.

26. The reprogrammable multi-mode electromagnetic radiation emitting device as in claim 23, wherein said memory is a EEPROM.

27. The reprogrammable multi-mode electromagnetic radiation emitting device as in claim 26, wherein said memory is selected from the group consisting of PLA and FPGA.

28. A night activated multi-mode electromagnetic radiation emitting device, comprising:
an emission module comprising at least one electromagnetic radiation emitting source, a first terminal, a second terminal and a polarity responsive controller interposed between said electromagnetic radiation emitting sources and said first and second terminals;
a DC power source comprising a positive terminal and a negative terminal;
a polarity switch selectively defining either interconnections between (a) said first and positive terminals and (b) said second and negative terminals, or interconnections between (a) said first and negative terminals and (b) said second and positive terminals; and
an ambient light sensor;
wherein the polarity responsive controller comprises:
a set of signalling instructions;
a first power supply circuit activated by the interconnections between (a) said first and positive terminals and (b) said second and negative terminals, and supplying, when activated, power from said DC power source to said electromagnetic radiation emitting sources according to said set of signalling instructions, thereby causing said sources to emit electromagnetic radiation according to said set of instructions; and
a second power supply circuit activated when light incident on said light sensor is below a predetermined threshold and the interconnections between (a) said first and negative terminals and (b) said second and positive terminals, and supplying, when activated, power from said DC power source to said electromagnetic radiation emitting sources according to said set of signalling instructions, thereby causing said sources to emit electromagnetic radiation according to said set of instructions.

29. The night activated multi-mode electromagnetic radiation emitting device of claim 28, wherein said light sensor comprises a photodiode.

30. A water activated multi-mode electromagnetic radiation emitting device, comprising:
an emission module comprising at least one electromagnetic radiation emitting source, a first terminal, a second terminal and a polarity responsive controller interposed between said electromagnetic radiation emitting sources and said first and second terminals;
a DC power source comprising a positive terminal and a negative terminal;
a polarity switch selectively defining either interconnections between (a) said first and positive terminals and (b) said second and negative terminals, or interconnections between (a) said first and negative terminals and (b) said second and positive terminals; and a water sensor;

wherein the polarity responsive controller comprises:
  a set of signalling instructions;
  a first power supply circuit activated by the interconnections between (a) said first and positive terminals and (b) said second and negative terminals, and supplying, when activated, power from said DC power source to said electromagnetic radiation emitting sources according to said set of signalling instructions, thereby causing said sources to emit electromagnetic radiation according to said set of instructions; and
  a second power supply circuit activated when said water sensor is immersed in water and the interconnections between (a) said first and negative terminals and (b) said second and positive terminals, and supplying, when activated, power from said DC power source to said electromagnetic radiation emitting sources according to said set of signalling instructions, thereby causing said sources to emit electromagnetic radiation according to said set of instructions.

31. A multi-mode electromagnetic radiation emitting device tolerant to external magnetic fields, comprising:

a source of power;

an emission module comprising at least one electromagnetic radiation emitting source;

a switch mechanism for providing selectable switched circuit connections, comprising:
  a first part and a second part arranged for relative displacement;
  a ratchet mechanism for limiting the displacement of the first part relative to the second part to predetermined positions, at least one of said predetermined positions being a deactivated position, the remainder being activated positions;
  a plurality of spaced magnetically actuated switches mounted on said first part; and
  a magnet mounted on said second part such that said magnet moves relative to said switches in response to movement of said second part relative to said first part, said magnet selectively actuating certain of said switches;

wherein when said first part is in one of said deactivated positions, and one or more of said magnetically actuated switches are actuated by the external magnetic field, power from said power source is not provided to said at least one electromagnetic radiation emitting source, thereby preventing said at least one radiation emitting source from emitting radiation.

32. The switch mechanism of claim 31, wherein said emission module further comprises an electronic assembly for selectively providing power from said power source to said at least one electromagnetic radiation emitting source.

33. The switch mechanism of claim 32, wherein when said first part is in said deactivated position, said magnet actuates a normally closed read switch interconnecting said power source and said electronics, thereby preventing power from reaching said electronics.

34. The switch mechanism of claim 31, wherein said switches are selected from a group consisting of read switches and hall effect sensors or combinations thereof.

* * * * *